United States Patent [19]

Hulsman et al.

[11] 4,169,255
[45] Sep. 25, 1979

[54] AUTOMATIC NOISE SUPPRESSION SYSTEM FOR ACOUSTIC HEIGHT SENSOR

[75] Inventors: Leonard A. Hulsman, Seattle; Grant R. Montague, Edmonds, both of Wash.

[73] Assignee: The Boeing Company, Seattle, Wash.

[21] Appl. No.: 457,103

[22] Filed: Apr. 1, 1974

[51] Int. Cl.² .............................................. G01S 9/68
[52] U.S. Cl. .............................. 367/100; 73/290 V; 367/900; 367/901
[58] Field of Search ...... 340/1 C, 1 L, 3 T, 15.5 GC, 340/16, 1 R; 343/5 SM, 7 VM; 73/290 V, 67.7

[56] References Cited

U.S. PATENT DOCUMENTS

| | | | |
|---|---|---|---|
| 3,539,978 | 11/1970 | Steptnitz | 340/1 C |
| 3,704,442 | 11/1972 | Wright | 340/1 L |
| 3,739,325 | 6/1973 | Ludwig | 340/1 C |
| 3,944,942 | 3/1976 | Chudleigh | 340/15.5 GC |

OTHER PUBLICATIONS

Carpenter, "A Digital Echo-counting System for use in Fisheries Research," 5/67, pp. 289-294, The Radio and Electronic Engineer.

*Primary Examiner*—Nelson Moskowitz
*Attorney, Agent, or Firm*—Nicolaas DeVogel

[57] ABSTRACT

An acoustic height sensor, particularly adapted for use in the foil-borne mode of operation of a hydrofoil, wherein sensitivity to noise pulses is materially reduced or essentially eliminated by monitoring for noise levels capable of producing interference and, if the noise persists for a sufficiently long period, suspending processing of any signal returns until the noise ceases. In the meantime, and as processing of signal returns is suspended, sample and hold circuitry maintains the output of the system at its previous level until the noise abates.

4 Claims, 3 Drawing Figures

A SYNC
B TRANSMIT
C RECEIVE
D RECTIFY
E GATED VOLTAGE
F RAMP
G BLANKING

AUTOMATIC NOISE SUPPRESSION SYSTEM FOR ACOUSTIC HEIGHT SENSOR

RIGHTS TO THE INVENTION

The Government has rights in this invention pursuant to Contract No. N00024-73-C-0257, awarded by the Department of the Navy.

BACKGROUND OF THE INVENTION

The design of a control system for foil-borne operation of a hydrofoil craft depends, in part, upon feedback information regarding the height of the craft above the water, or, alternatively, foil depth. This feedback is obtained from a height sensor which operates on the same basic principle as a pulsed radar system except that ultrasonic frequencies are used instead of microwave frequencies. Ultrasonic height sensors of this type have exhibited a sensitivity to noise impulses, the extent of the problem varying from one design to another depending on the sensor operating frequency and other internal design features, and the energy spectrum and duration of the noise impulses. If noise impulses of this type are not eliminated, the resulting change in craft height will typically vary from a foot or so (perceived as a "bump") to broaching of the forward foil, followed by slamming of the hull into the water. As can be appreciated, the effectiveness of the hydrofoil craft is degraded accordingly.

In the past, there has been no satisfactory means for solving the problem of noise impulses in height sensors of this type. Some existing designs utilize a "range gate" which rejects all return echoes except those received within some predetermined window positioned about the last processed return. This provides some noise rejection capability, but the design still processes as valid any noise occurring while the range gate is open. Furthermore, each time the range gate blanking is changed, the range gate is repositioned to a shorter range. As a result, interference continuing over several cycles of operation causes the craft to operate at a decreased foil submergence; and if it persists long enough, broaching can result.

SUMMARY OF THE INVENTION

In accordance with the present invention, the foregoing and other disadvantages of ultrasonic height sensors are obviated by a system wherein noise levels capable of producing interference are monitored; and if such noise persists for a sufficiently long period, processing of any signal returns is suspended until the noise ceases.

In the embodiment of the invention shown herein, blanking of incoming signals is initiated when noise of sufficient amplitude has existed for a predetermined period of time. When blanking occurs, the output of the sensor is switched to a value which is the average of what has existed for about the last ten seconds. This accomplishes a smooth transition from a non-blanked to a blanking operation. Additionally, the internal automatic gain control system is held at the value existing at the instant of blanking. If blanking is sustained for a period longer than approximately 400 microseconds, it is then maintained for about 70 microseconds after the filtered noise energy level subsides below the bias point. This provides a margin against "locking on" a slowly diminishing noise signal once blanking terminates.

The above and other objects and features of the invention will become apparent from the following detailed description taken in connection with the accompanying drawings which form a part of this specification, and in which:

FIG. 1 is a simplified block diagram of the acoustic height and sensor and noise suppression system of the invention;

FIG. 2 comprises simplified waveforms illustrating the operation of the system of FIG. 1; and FIG. 3 is a detailed block diagram of the system of the invention.

DESCRIPTION OF PREFERRED EMBODIMENT

Figure 1:
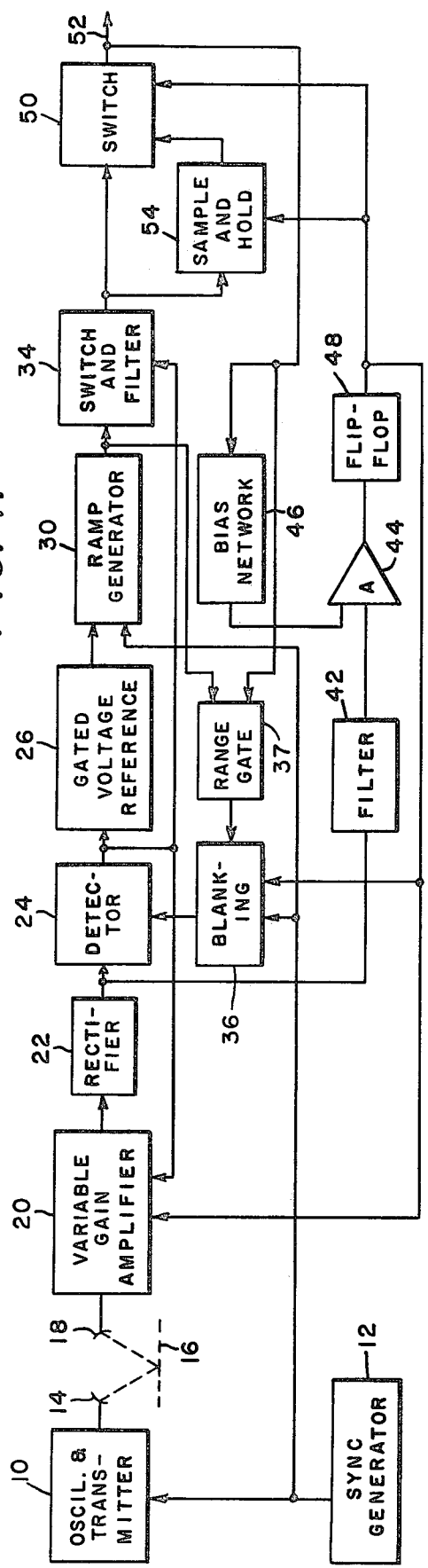

It should be understood that the system shown in FIG. 1 is not intended to be a complete system and is included herein for purpose of explanation. It includes an oscillator and transmitter 10 controlled by a sync generator 12. The oscillator and transmitter 10 generates bursts of ultrasonic wave energy which are transmitted from a transmitting transducer 14 and directed downwardly toward the surface 16 of water beneath a hydrofoil, for example. The reflected burst of ultrasonic wave energy is detected by a receiving transducer 18 and applied to a variable gain amplifier 20. As will be appreciated, the amplitude of returned pulses decreases as the height of the return transducer 18 above the surface 16 increases. Accordingly, in order to maintain the amplitude of received pulses essentially constant, a variable gain amplifier 20 is provided with an automatic gain control system, hereinafter described in greater detail, which increases gain either as height above the water increases or as the percentage of processed returns decreases.

Figure 2:
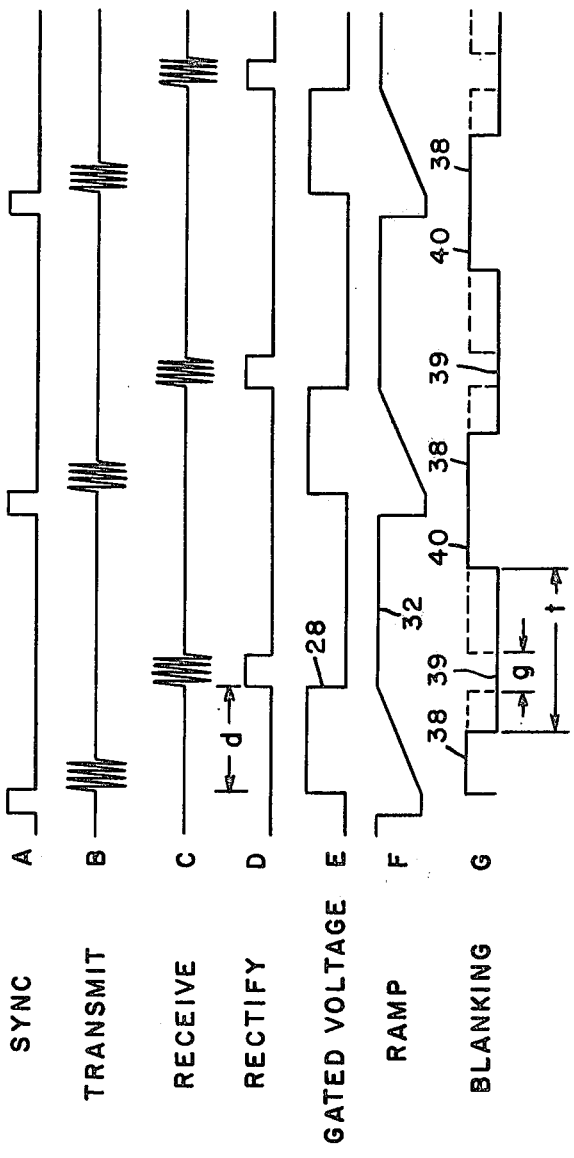

The sync pulses from generator 12, occurring approximately every 91 msec, are illustrated as waveform A in FIG. 2. The leading edge of the sync pulses initiates a reset of various logic and timing functions within the sensor. At the trailing edge of the sync pulse, transmitted bursts of ultrasonic wave energy occur, these being illustrated as waveform B. The received bursts of ultrasonic wave energy are illustrated as waveform C; and these are rectified in rectifier 22 to produce waveform D. The distance of the receiving transducer 18 above the level 16 is, therefore, equal to the distance between the leading edges of the pulses in waveforms B and C, or the distance d in FIG. 2.

The rectified output of rectifier 22 comprising waveform D is then applied to a detector 24 which is implemented as a flip-flop circuit. The output of the flip-flop, in turn, is utilized to turn OFF a gated voltage reference circuit 26, the arrangement being such that the output of the gated voltage reference circuit 26 will appear as waveform E. In this respect, the detector 24, due to the presence of a blanking pulse initiated by the sync pulses in waveform A, will turn ON the gated voltage reference circuit 26 conincident with transmission of the ultrasonic burst, producing a constant current output until a return signal is received. Hence, the output of the gated voltage reference circuit 26 will be a pulse 28 in waveform E which persists for the period d. This pulse is applied to a ramp generator 30 which produces a ramp output (appearing as waveform F) in the period d and then holds the voltage level 32 until reset by a sync pulse from sync generator 12 in waveform A. The output of the ramp generator, in turn, is applied to a switch and filter 34. The switch is controlled by the output of detector 24 and closes to pass an output upon the occurrence of the trailing edge of the gated voltage pulse in waveform E. Hence, the output of the filter circuit 34 is essentially the filtered voltage level 32 which, in turn, is proportional to range or height above the water level 16.

As was mentioned above, it is desirable to blank the output of the detector 24 at the beginning and end of each transmission period in order to prevent spurious signals from passing through the output. Hence, a blanking signal (waveform G of FIG. 2) is generated by blanking circuit 36 and includes a period 38 at the beginning of each transmission-reception cycle and a second period 40 at the end of each cycle. With this arrangement, return signals in waveform D can pass to the output only during the time period t which is that time period in which useful or true return signals can occur, as determined by the minimum and maximum distances possible between the water 16 and the transducer 18.

At the beginning of each transmission period, the blanking pulse 38 will cause the flip-flop detector 24 to assume one of two stable states whereby the voltage in waveform E rises. Upon the occurrence of a true return in waveform D, however, the flip-flop detector 24 is caused to assume its other stable state such that the voltage in waveform E falls. At the same time, the output of the flip-flop is such as to close the switch 34 to generate an output. The pulse 40 in waveform G, on the other hand, prevents signals occurring after the time period t from triggering the detector 24 and, in effect, limits the maximum range which can be indicated at the output of the system.

In addition to the short-range and long-range blanking just described, a range gate 37 is provided. This feature extends the blanking period and reduces the time period t during which returns can trigger the detector 24. The gate is re-positioned following each processed return so that any subsequent return, in order to trigger detector 24 and be processed, must occur within a range of 2.0 feet shorter to 4.5 longer than the held range value. This range gate is represented by the period g shown in waveform G. In the event that seven consecutive missed returns occur, the range gate function is interrupted and the unblanked period is expanded to the duration t shown in waveform G. The range gate function is then restored following the next processed return.

As was mentioned above, noise can occur in the period t, giving rise to a false indication of a return pulse. In accordance with the present invention, and assuming that a noise pulse of sufficient amplitude is detected, the blanking circuit 36 is caused to blank out all return signals including those occurring in the period t such that return echoes cannot affect the output of the system. It will be remembered from the preceding description that as the height of the receiving transducer above the water level increases, the amplitude of the return pulses will decrease. Furthermore, as the height of the receiving transducer increases, so also will the amplitude of the height signal at the output of circuit 34. Due to the fact that the received pulses are larger in amplitude at lower heights, a greater degree of noise is required at the lower heights in order to give a false trigger; whereas as the height increases and the amplitude of true returns decreases, the system is more susceptible to noise.

Therefore, in order to sense noise, some means must be provided for decreasing the amplitude at which the noise detector will be triggered as height increases. In this regard, the output of rectifier 22 is applied through a filter 42 to one input of an operational amplifier 44 where it is compared with the output of a bias network 46 responsive to the height output signal from the system. As height increases, the bias is decreased such that by comparing the bias signal with the rectified output from rectifier 22 in amplifier 44, an output will be derived from the amplifier 44 at lower amplitudes as height increases.

When an output is produced by amplifier 44, indicating the presence of noise, a flip-flop circuit 48 is triggered. When this occurs, several things happen. First, switch 50 which normally connects the output of circuit 34 directly to output lead 52 now disconnects lead 52 from the output of circuit 34 and connects it to the output of a sample and hold circuit 54. The sample and hold circuit 54 is also connected to the output of circuit 34 and continually samples and filters the signal at the output of circuit 34 until flip-flop 48 is triggered, whereupon the sample and hold circuit maintains its existing output which is applied through switch 50 to output lead 52. Thus, when noise occurs, the output is maintained at a value approximately equal to the average existing during the previous ten seconds, and is maintained at essentially that value until the noise abates.

If flip-flop 48 is triggered for an extended period (e.g., 10 seconds or more) due to a very noisy environment or an internal failure, the sample and hold circuit 54 has a slow drift rate incorporated into its output which causes the craft to automatically land. This is a fail-safe feature which protects against a prolonged loss of height feedback to the automatic control system.

In addition, when flip-flop 48 is triggered, a signal is applied via blanking circuit 36 to blank out the entire receive period whereby no further return signals or noise can be detected during the time that the noise occurs. Finally, the flip-flop 48, when triggered, acts to cause the variable gain amplifier 20 to maintain its gain at that level which persisted immediately prior to the occurrence of noise.

When the noise abates, the output of rectifier 22 will no longer exceed that from the bias network 46, whereupon the output from amplifier 44 decreases and the flip-flop 48 is triggered in the opposite sense to again initiate normal operation of the system. That is, the switch 50 is positioned so as to connect the output of circuit 34 directly to output lead 54; the blanking circuit 36 operates as previously described; and the variable gain amplifier 20 now controls the gain in proportion to the height of the receiving transducer above the water level, and to the percentage of processed returns. As was explained above, however, if blanking due to noise persists for a period longer than about 400 microseconds, it is maintained for an additional 70 microseconds after the noise abates to prevent "locking on" a slowly diminishing noise signal once blanking terminates.

There are several types of noise conditions which can exist, some of which will result in interference with true, received returns while others will not. For example, an occasional burst of noise may occur which is of a duration insufficient to trigger the blanking function. If it occurs during the period t shown in FIG. 2, it will cause one incorrect measurement. However, this will not affect craft operation since, in a typical sampled-data system in which the sensor is used, such isolated, erroneous inputs are effectively filtered out by the downstream electronics of the automatic control system. Another example of noise is a set of recurring noise pulses, each of a duration insufficient to trigger the blanking function. For sensors with a range gate feature (i.e., signal blanked except during the time g) these recurring pulses, in order to produce continuing interference, would have to be properly timed so that they successively occur within the time interval g, during which the detector 24 can pass signals. The position of the interval within the operating cycle would be changing in successive cycles; and the probability of occurrence of such synchronized noise is considered to be extremely remote. For sensors without a range gate, such pulses could cause a continually varying output which would probably be unusable. Hence, it is desirable to use a feature such as that produced by the range gate circuit 37.

A further type of noise comprises a set of recurring noise pulses of duration which covers a significant fraction of the interval between transmitted pulses. For example, if pulses of 250 milliseconds duration are to occur every 750 milliseconds, the noise, and the blanking it causes, proportionally reduces the time available for measuring actual craft height. This can result in ride quality degradation, dependent on existing sea-state conditions. However, the degradation would be considerably worse without the blanking function because the foil broach-hull slam sequence would be a continual recurrence rather than an occasional thing.

Perhaps the most common type of noise which will cause triggering of flip-flop 48 is a continuous burst. In this case, the longer the duration the more prolonged is the period during which the craft is operating without actual height information. The severity of the resulting ride degradation is greatly reduced with the present invention due to the operation of the blanking function provided by flip-flop 48 because the output is then held at its previous value by the sample and hold circuit 54 and the noise is not processed as a valid return. In the absence of the present invention, continuous noise would be processed as a series of returns, each 2.0 feet shorter than the previous one due to the action of range gate 37, until the range gate g in waveform G is positioned adjacent to the end of the short-range blanking period. This "stair-stepped" output will cause the depth of the forward foil to decrease until it broaches the water surface.

Figure 3:
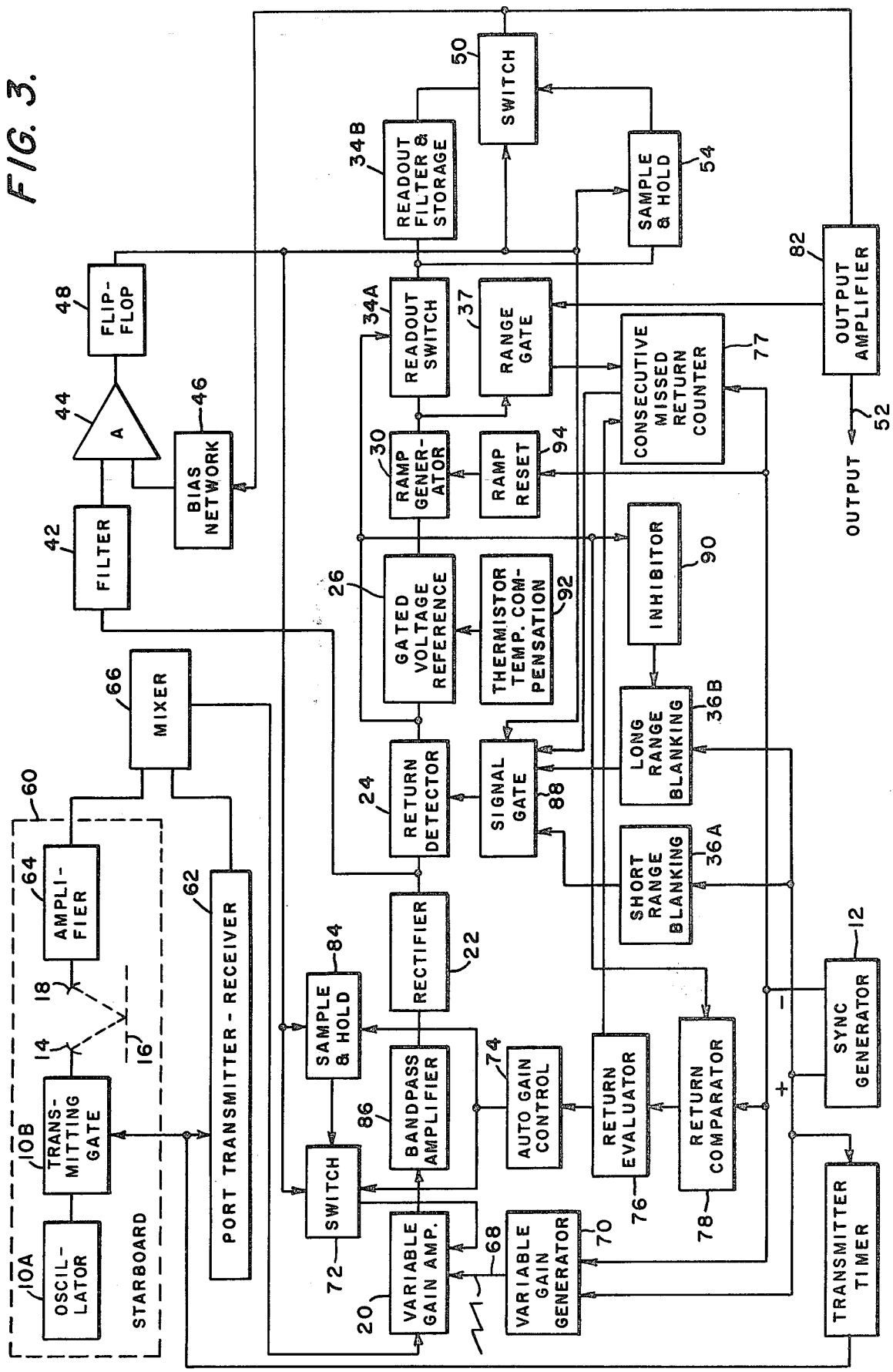

A complete detailed schematic block diagram of a typical system incorporating the features of the invention is shown in FIG. 3 wherein elements corresponding to those of FIG. 1 are identified by like reference numerals. In the system shown in FIG. 3, there are transmitter-receivers for both the port and starboard sides of a hydrofoil craft. The starboard transmitter-receiver is identified by the reference numeral 60 and that for the portside is identified by the reference numeral 62, it being understood that the port transmitter-receiver is identical to the starboard one. After amplification in amplifier 64 in each of the transmitter-receivers, the return signals are mixed in mixer 66 and applied to the variable gain amplifier 20.

The variable gain amplifier 20 has applied thereto a sawtooth waveform produced by a variable gain generator 70. The variable gain generator, in turn, is controlled by the sync generator 12 and, more particularly, by positive and negative outputs of the sync generator 12. The arrangement is such that at the transmission of an ultrasonic burst, the ramp output from the generator 70 begins to build up and is then reset just prior to the next transmission. The reason for this is that as the range of distance of the surface of the water from the transducer increases, the amplitude of the return signal decreases. Accordingly, the gain of the amplifier 20 is increased as range increases and the return amplitude decreases to compensate for the attenuation in the return signal.

The gain of amplifier 20 is also controlled through switch 72 by an automatic gain control circuit 74. The AGC circuit 74, in turn, is controlled by a return evaluator 76 and return comparator 78. The comparator 78 operates in conjunction with the return evaluator 76 as a flip-flop whose output state during each entire transmission-reception cycle is determined by the state of the detector 24 output at the instant the sync pulse is sent from the sync generator 12. Thus, the state of this binary output indicates for about 91 msec whether or not a return was processed in the preceding 91-msec period. It is this binary output which is filtered and used by the AGC circuit 74 to establish a gain level dependent upon the average number of return signals; whereas the gain generator 70 varies the gain over and above that established by computer 74 during each transmit period. The output of the gain computer 74 is also applied to a sample and hold circuit 84 adapted to be connected through switch 72 to the variable gain amplifier 20. When switch 72 is actuated, the computer is disconnected from amplifier 20 and the sample and hold circuit 84 establishes in the variable gain amplifier that gain factor which existed just prior to the time that the switch was actuated. As will be seen, switch 72 is actuated upon the occurrence of noise which will cause interference.

The output state of the return evaluator 76, together with sync pulses from generator 12, are applied to a consecutive missed return counter 77. The counter 77 operates such that if seven consecutive missed returns occur, the counter 77 will count seven sync pulses and disconnect the range gate 37 from signal gate 88 for the reason explained above (i.e., expanding the unblanked period to the duration t, FIG. 2). The occurrence of any single return at any time acts to reset the counter 77 during the next sync pulse.

From variable gain amplifier 20, the signal passes through a bandpass amplifier 86 which rejects frequencies other than those from a returned signal. In this respect, the bandpass amplifier 86 acts to reject noise other than that occurring within the frequency spectrum at which a returned burst of ultrasonic oscillation is expected.

The output of the bandpass amplifier 86 is applied through a rectifier 22 to the amplitude-sensitive return detector 24 which is controlled by a signal gate 88 responsive to a short-range blanking circuit 36A and a long-range blanking circuit 36B. The short-range blanking circuit 36A, responsive to the sync generator 12, produces blanking pulse 38 shown in waveform G of FIG. 2; whereas long-range blanking circuit 36B produces pulse 40 in waveform G. The two pulses, 38 and 40, coalesce during the reset period to produce a continuous blanking except during the period t in waveform G. The long-range blanking circuit 90 when the output of the return detector 24 indicates that a returned pulse occurs inside the time period t shown in FIG. 2. This inhibiting action permits the signal 88 and return detector 24 to sustain an actuated condition until the reset pulse occurs upon the leading edge of the next sync pulse. This sustained output from the detector 24 is necessary to the proper operation of the return comparator 78 and the return evaluator 76 just discussed, and of the gated voltage reference 26 and the readout switch 34A.

From the return detector 24, the signal is applied to the gated voltage reference 26 which, as was explained in connection with FIG. 2, produces the output waveform E. In effect, the gated voltage reference produces a constant current for the ramp generator 30; but since the range indication ultrasonic pulses is temperature dependent, a thermistor 92 is provided to compensate for changes in the ambient temperature and varies the output of the voltage reference 26 in proportion to temperature.

The ramp generator 30 is reset by a ramp reset circuit 94 at the end of each transmission-reception cycle by the sync generator 12. From ramp generator 30, the signal passes through a read-out switch 34A, opened by the return detector 24, and a read-out filter and storage circuit 34B to the switch 50 previously described and output amplifier 82.

The remainder of the circuitry is the same as that described in connection with FIG. 1. Thus, the output of rectifier 22, after filtering in filter 42, is compared with a signal from bias network 46 proportional to output signal amplitude. If the output of filter 42 exceeds the bias established by network 46, indicating the existence of noise, the flip-flop 48 is actuated via amplifier 44. At this point, switch 50 is actuated to disconnect circuit 34B from circuit 82 and connects the sample and hold circuit 54 to the output amplifier 82; while the circuit 54 establishes the output at the level described earlier. At the same time, actuation of the flip-flop 48 upon the occurrence of noise causes switch 72 to disconnect the AGC circuit 74 from amplifier 20 while connecting the sample and hold circuit 84 to amplifier 20 so as to maintain the gain of the amplifier at the level established prior to the occurrence of noise.

It can thus be seen that the present invention provides an ultrasonic height sensor which discriminates against noise and which, at the same time, maintains a previously-established height signal until the noise abates.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In an ultrasonic distance sensor adapted to receive bursts of ultrasonic wave energy reflected from a distance surface, the combination of means responsive to said received bursts for producing a pulsed signal representative of said received bursts, means responsive to said pulsed signal for producing an electrical signal proportional to the range of said distant surface, sample and hold circuit means, means for applying said electrical signal proportional to range to said sample and hold circuit means such that the sample and hold circuit means can be actuated to store the previous value of said electrical signal proportional to range, means for detecting the presence of noise of predetermined magnitude in wave energy received by said sensor, means coupled to said detecting means and operable when noise is detected for actuating said sample and hold circuit means to store said electrical signal proportional to range while preventing passage of pulsed signals to said means for producing a signal proportional to range, and wherein said means for producing an electrical signal proportional to range includes a variable gain amplifier for amplifying returned bursts of ultrasonic wave energy, means for varying the gain of said variable gain amplifier as a function of the range of said distant surface, and second sample and hold circuit means for maintaining the gain of said variable gain amplifier constant when noise of predetermined magnitude is detected by said detecting means.

2. The combination of claim 1 wherein said means for producing an electrical signal proportional to range includes a gated voltage reference source, a ramp generator connected to the output of said gated voltage reference source, and means for varying the output of said gated voltage reference source as a function of ambient temperature.

3. The combination of claim 1 wherein said means for detecting the presence of noise comprises means for comparing the amplitude of returned bursts of ultrasonic wave energy with a signal proportional to said electrical signal indicative of range, and flip-flop circuit means actuated when the comparison of said signals indicates the existence of noise for actuating both said first and second sample and hold circuit means.

4. The combination of claim 1 including ramp generator means for increasing the gain of said variable gain amplifier each time a burst of ultrasonic wave energy is transmitted by said distance sensor.

* * * * *